United States Patent
Li et al.

(10) Patent No.: US 11,051,298 B2
(45) Date of Patent: Jun. 29, 2021

(54) MESSAGE FEEDBACK METHOD AND APPARATUS FOR CARRIER AGGREGATION

(71) Applicant: Huawei Technologies Co., Ltd., Guangdong (CN)

(72) Inventors: Hua Li, Shanghai (CN); Zhongfeng Li, Munich (DE); Jiehua Xiao, Shanghai (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/396,539

(22) Filed: Apr. 26, 2019

(65) Prior Publication Data
US 2019/0254029 A1    Aug. 15, 2019

Related U.S. Application Data

(63) Continuation of application No. PCT/CN2016/103854, filed on Oct. 28, 2016.

(51) Int. Cl.
*H04W 72/04*    (2009.01)
*H04L 27/26*    (2006.01)
(Continued)

(52) U.S. Cl.
CPC ....... *H04W 72/0446* (2013.01); *H04L 1/1861* (2013.01); *H04L 1/1893* (2013.01);
(Continued)

(58) Field of Classification Search
CPC ..... H04L 1/1861; H04L 1/1893; H04L 5/001; H04L 5/0055; H04L 5/0078; H04L 5/14;
(Continued)

(56) References Cited

U.S. PATENT DOCUMENTS 8,565,066 B2    10/2013 Nam et al.
10,153,867 B2 *  12/2018 Chen .................... H04L 1/1812
(Continued)

FOREIGN PATENT DOCUMENTS

CN    102624507 A    8/2012
CN    102651680 A    8/2012
(Continued)

OTHER PUBLICATIONS

3GPP TS 36.321 V14.0.0; 3rd Generation Partnership Project; Technical Specification Group Radio Access Network; Evolved Universal Terrestrial Radio Access (E-UTRA); Medium Access Control (MAC) protocol specification (Release 14); Sep. 2016, 96 pages.
(Continued)

*Primary Examiner* — Thomas R Cairns
(74) *Attorney, Agent, or Firm* — Slater Matsil, LLP

(57) ABSTRACT

Embodiments of the present disclosure provide a message feedback method and apparatus for carrier aggregation. The method includes: receiving, by a terminal in a first downlink subframe on a carrier aggregation group, a data packet sent by a base station, where the carrier aggregation group includes a first carrier and a second carrier; determining a first timing, based on a subframe configuration for the carrier aggregation group and a mapping relationship between subframe configurations for carrier aggregation groups and timings; determining a first uplink subframe from subframes on the carrier aggregation group based on the first timing; and sending, to the base station, a feedback message in the first uplink subframe. In this way, the first uplink subframe is determined on the entire carrier group for sending the feedback message, and a selectable range is larger.

19 Claims, 5 Drawing Sheets

Uplink subframe

Downlink subframe

Special subframe

TDD configuration 1

TDD configuration 2

(51) Int. Cl.
*H04L 5/14* (2006.01)
*H04L 5/00* (2006.01)
*H04L 1/18* (2006.01)

(52) U.S. Cl.
CPC ............ H04L 5/001 (2013.01); H04L 5/0055 (2013.01); H04L 5/0078 (2013.01); H04L 5/14 (2013.01); H04L 27/2666 (2013.01); H04W 72/04 (2013.01)

(58) Field of Classification Search
CPC ....... H04L 27/2666; H04L 1/001; H04L 5/00; H04L 5/003; H04L 5/0082; H04L 5/0092; H04L 5/1407–18; H04L 5/1469; H04L 5/1476–1484; H04L 25/22; H04W 72/04; H04W 72/0446; H04W 16/00; H04W 36/06; H04W 72/0406–10; H04W 72/12
See application file for complete search history.

(56) References Cited

U.S. PATENT DOCUMENTS 10,159,067 B2 * 12/2018 Yi ........................... H04L 5/001
2013/0322378 A1 12/2013 Guan et al.
2013/0336267 A1 12/2013 Li et al.
2014/0022962 A1 * 1/2014 Yang ................. H04W 72/0413
370/280
2015/0215078 A1 7/2015 Chen et al.
2017/0086174 A1 3/2017 Zhang
2017/0303182 A1 * 10/2017 Uchino ................. H04W 16/12

FOREIGN PATENT DOCUMENTS

| CN | 104936189 A | 9/2015 |
| CN | 105103581 A | 11/2015 |
| CN | 105900503 B | 5/2020 |
| EP | 2690806 A2 | 1/2014 |

OTHER PUBLICATIONS

3GPP TS 36.213 V14.0.0; 3rd Generation Partnership Project; Technical Specification Group Radio Access Network; Evolved Universal Terrestrial Radio Access (E-UTRA); Physical layer procedures (Release 14); Sep. 2016, 406 pages.

* cited by examiner

MESSAGE FEEDBACK METHOD AND APPARATUS FOR CARRIER AGGREGATION

CROSS-REFERENCE TO RELATED APPLICATIONS

This application is a continuation of International Application No. PCT/CN2016/103854 filed on Oct. 28, 2016, the disclosure of which is hereby incorporated by reference in its entirety.

TECHNICAL FIELD

The present application relates to communications technologies, and in particular, to a message feedback method and apparatus for carrier aggregation.

BACKGROUND

Hybrid automatic repeat request (HARQ) is a technology that combines forward error correction (FEC) and automatic repeat request (ARQ) methods. In FEC, redundant information is added so that a receive end can correct some errors, thereby reducing a quantity of retransmissions. For an error that cannot be corrected by FEC, the receive end requests, by using the ARQ mechanism, a transmit end to resend data. In a specific implementation process, the receive end uses an error detection code to detect whether a received data packet contains an error. If there is no error, the receive end sends an acknowledgment (ACK) to the transmit end. If there is an error, the receive end sends a negative acknowledgment (NACK) to the transmit end, and after receiving the NACK, the transmit end resends the data packet.

In the prior art, after receiving a data packet, the receive end returns an ACK or a NACK based on a preset timing. However, to provide larger bandwidth, carrier aggregation (CA) technologies are introduced to Long Term Evolution (LTE). For aggregated carriers, resources are wasted if an ACK or a NACK is still fed back based on an existing timing.

SUMMARY

Embodiments of the present disclosure provide a message feedback method and apparatus for carrier aggregation, so as to resolve a problem in the prior art that returning of an ACK or a NACK causes a waste of resources.

A first aspect of the embodiments of the present disclosure provides a message feedback method for carrier aggregation, including:

receiving, by a terminal in a first downlink subframe on a carrier aggregation group, a data packet sent by a base station, where the carrier aggregation group includes a first carrier and a second carrier;

determining, by the terminal, a first timing, based on a subframe configuration for the carrier aggregation group and a mapping relationship between subframe configurations for carrier aggregation groups and timings;

determining, by the terminal, a first uplink subframe from subframes on the carrier aggregation group based on the first timing; and sending, by the terminal to the base station, a feedback message in the first uplink subframe.

Optionally, the determining, by the terminal, a first timing, based on a subframe configuration for the carrier aggregation group and a mapping relationship between subframe configurations for carrier aggregation groups and timings includes:

obtaining, by the terminal, the subframe configuration information for the carrier aggregation group, where the subframe configuration for the carrier aggregation group includes a subframe configuration for the first carrier and/or a subframe configuration for the second carrier; and determining, by the terminal, the first timing, based on the subframe configuration information for the carrier aggregation group and the mapping relationship between subframe configurations for carrier aggregation groups and timings.

Optionally, the subframe configuration for the first carrier and/or the subframe configuration for the second carrier are/is a subframe configuration(s) other than the existing TDD subframe configurations 0 to 6.

Optionally, the first timing is used to indicate that when the first uplink subframe is a subframe n, the first downlink subframe is a subframe that is at an interval of k subframes before the subframe n, where n is a positive integer greater than or equal to 0, and k is a positive integer greater than 0.

Optionally, that when the first uplink subframe is a subframe n, the first downlink subframe is a subframe that is at an interval of k subframes before the subframe n includes:

when the first uplink subframe is a subframe n on the first carrier, the first downlink subframe is a subframe that is at an interval of k subframes before the subframe n on the first carrier; or when the first uplink subframe is a subframe n on the first carrier, the first downlink subframe is a subframe that is at an interval of k subframes before the subframe n on the second carrier; or when the first uplink subframe is a subframe n on the second carrier, the first downlink subframe is a subframe that is at an interval of k subframes before the subframe n on the first carrier; or when the first uplink subframe is a subframe n on the second carrier, the first downlink subframe is a subframe that is at an interval of k subframes before the subframe n on the second carrier.

Optionally, when the subframe configuration for the first carrier is the time division duplex TDD configuration 2, and the subframe configuration for the second carrier is the TDD configuration 2 with a 2-subframe shift, when the first uplink subframe is a subframe n=2 on the first carrier, values of the subframe interval k of the first downlink subframe on the first carrier are 4 and 6, and values of the subframe interval k are 4, 5, and 6 on the second carrier;

when the first uplink subframe is a subframe n=7 on the first carrier, a value of the subframe interval k of the first downlink subframe is 4 on the first carrier, and values of the subframe interval k of the first downlink subframe are 4 and 5 on the second carrier;

when the first uplink subframe is a subframe n=2 on the second carrier, values of the subframe interval k of the first downlink subframe are 5 and 6 on the first carrier, and a value of the subframe interval k of the first downlink subframe is 6 on the second carrier; and when the first uplink subframe is a subframe n=7 on the second carrier, values of the subframe interval k of the first downlink subframe are 4, 5 and 6 on the first carrier, and values of the subframe interval k of the first downlink subframe are 4 and 6 on the second carrier.

Optionally, when the subframe configuration for the first carrier is the time division duplex TDD configuration 1, and the subframe configuration for the second carrier is the TDD configuration 2 with a 2-subframe shift, when the first uplink subframe is a subframe n=2 on the first carrier, values of the subframe interval k of the first downlink subframe are 4 and 5 on the second carrier;

when the first uplink subframe is a subframe n=3 on the first carrier, a value of the subframe interval k of the first downlink subframe is 4 on the first carrier, and a value of the subframe interval k of the first downlink subframe is 4 on the second carrier;

when the first uplink subframe is a subframe n=7 on the first carrier, values of the subframe interval k of the first downlink subframe are 4 and 5 on the second carrier;

when the first uplink subframe is a subframe n=8 on the first carrier, a value of the subframe interval k of the first downlink subframe is 4 on the first carrier, and a value of the subframe interval k of the first downlink subframe is 4 on the second carrier;

when the first uplink subframe is a subframe n=2 on the second carrier, values of the subframe interval k of the first downlink subframe are 4 and 5 on the first carrier, and a value of the subframe interval k of the first downlink subframe is 4 on the second carrier; and when the first uplink subframe is a subframe n=7 on the second carrier, values of the subframe interval k of the first downlink subframe are 4 and 5 on the first carrier, and a value of the subframe interval k of the first downlink subframe is 4 on the second carrier.

A second aspect of the embodiments of the present disclosure provides a message feedback method for carrier aggregation, including:

receiving, by a base station in a second uplink subframe on a carrier aggregation group, a data packet sent by a terminal, where the carrier aggregation group includes a first carrier and a second carrier;

determining, by the base station, a second timing, based on a subframe configuration for the carrier aggregation group and a mapping relationship between subframe configurations for carrier aggregation groups and timings;

determining, by the base station, a second downlink subframe from subframes on the carrier aggregation group based on the second timing; and sending, by the base station to the terminal, a feedback message in the second downlink subframe.

Optionally, the determining, by the base station, a second timing, based on a subframe configuration for the carrier aggregation group and a mapping relationship between subframe configurations for carrier aggregation groups and timings includes:

obtaining, by the base station, the subframe configuration for the carrier aggregation group, where the subframe configuration for the carrier aggregation group includes a subframe configuration for the first carrier and/or a subframe configuration for the second carrier; and determining, by the base station, the second timing, based on the subframe configuration information for the carrier aggregation group and the mapping relationship between subframe configurations for carrier aggregation groups and timings.

Optionally, the second timing is used to indicate that when the second downlink subframe is a subframe n, the second uplink subframe is a subframe that is at an interval of k subframes before the subframe n, where n is a positive integer greater than or equal to 0, and k is a positive integer greater than 0.

Optionally, that the second timing is used to indicate that when the second downlink subframe is a subframe n, the second uplink subframe is a subframe that is at an interval of k subframes before the subframe n includes:

when the second downlink subframe is a subframe n on the first carrier, the second uplink subframe is a subframe that is at an interval of k subframes before the subframe n on the first carrier; or when the second downlink subframe is a subframe n on the first carrier, the second uplink subframe is a subframe that is at an interval of k subframes before the subframe n on the second carrier; or when the second downlink subframe is a subframe n on the second carrier, the second uplink subframe is a subframe that is at an interval of k subframes before the subframe n on the first carrier; or when the second downlink subframe is a subframe n on the second carrier, the second uplink subframe is a subframe that is at an interval of k subframes before the subframe n on the second carrier.

Optionally, when the subframe configuration for the first carrier is the time division duplex TDD configuration 2, and the subframe configuration for the second carrier is the TDD configuration 2 with a 2-subframe shift, when the second downlink subframe is a subframe n=1 on the first carrier, a value of the subframe interval k of the second uplink subframe is 6 on the second carrier;

when the second downlink subframe is a subframe n=3 on the first carrier, a value of the subframe interval k of the second uplink subframe is 6 on the first carrier;

when the second downlink subframe is a subframe n=6 on the first carrier, a value of the subframe interval k of the second uplink subframe is 6 on the second carrier;

when the second downlink subframe is a subframe n=8 on the first carrier, a value of the subframe interval k of the second uplink subframe is 6 on the second carrier;

when the second downlink subframe is a subframe n=0 on the second carrier, a value of the subframe interval k of the second uplink subframe is 6 on the first carrier;

when the second downlink subframe is a subframe n=3 on the second carrier, a value of the subframe interval k of the second uplink subframe is 6 on the second carrier;

when the second downlink subframe is a subframe n=5 on the second carrier, a value of the subframe interval k of the second uplink subframe is 6 on the first carrier; and when the second downlink subframe is a subframe n=8 on the second carrier, a value of the subframe interval k of the second uplink subframe is 6 on the second carrier.

Optionally, when the subframe configuration for the first carrier is the time division duplex TDD configuration 1, and the subframe configuration for the second carrier is the TDD configuration 2 with a 2-subframe shift, when the second downlink subframe is a subframe n=1 on the first carrier, a value of the subframe interval k of the second uplink subframe is 4 on the first carrier;

when the second downlink subframe is a subframe n=4 on the first carrier, a value of the subframe interval k of the second uplink subframe is 4 on the second carrier;

when the second downlink subframe is a subframe n=6 on the first carrier, a value of the subframe interval k of the second uplink subframe is 4 on the second carrier;

when the second downlink subframe is a subframe n=8 on the first carrier, a value of the subframe interval k of the second uplink subframe is 4 on the second carrier;

when the second downlink subframe is a subframe n=0 on the second carrier, a value of the subframe interval k of the second uplink subframe is 5 on the first carrier;

when the second downlink subframe is a subframe n=1 on the second carrier, a value of the subframe interval k of the second uplink subframe is 4 on the second carrier;

when the second downlink subframe is a subframe n=3 on the second carrier, a value of the subframe interval k of the second uplink subframe is 4 on the first carrier;

when the second downlink subframe is a subframe n=5 on the second carrier, a value of the subframe interval k of the second uplink subframe is 5 on the first carrier; and when the second downlink subframe is a subframe n=6 on the second carrier, a value of the subframe interval k of the second uplink subframe is 4 on the second carrier; and when the second downlink subframe is a subframe n=8 on the second carrier, a value of the subframe interval k of the second uplink subframe is 4 on the second carrier.

A third aspect of the embodiments of the present disclosure provides a subframe scheduling method for carrier aggregation, including:

determining, by a base station, a third timing, based on a subframe configuration for a carrier aggregation group and a mapping relationship between subframe configurations for carrier aggregation groups and timings, where the carrier aggregation group includes a first carrier and a second carrier;

determining, by the base station, a third downlink subframe corresponding to a to-be-scheduled uplink subframe from subframes on the carrier aggregation group based on the third timing; and sending, by the base station, uplink scheduling information in the third downlink subframe, where the uplink scheduling information is used to schedule the to-be-scheduled uplink subframe.

Optionally, the determining, by a base station, a third timing, based on a subframe configuration for the carrier aggregation group and a mapping relationship between subframe configurations for carrier aggregation groups and timings includes:

obtaining, by the base station, the subframe configuration for the carrier aggregation group, where the subframe configuration for the carrier aggregation group includes a subframe configuration for the first carrier and/or a subframe configuration for the second carrier; and determining, by the base station, the third timing, based on the subframe configuration information and the mapping relationship between subframe configurations for carrier aggregation groups and timings.

Optionally, the third timing is used to indicate that when the third downlink subframe is a subframe n, the to-be-scheduled uplink subframe is a subframe that is at an interval of k subframes after the subframe n, where n is a positive integer greater than or equal to 0, and k is a positive integer greater than 0.

Optionally, that the third timing is used to indicate that when the third downlink subframe is a subframe n, the to-be-scheduled uplink subframe is a subframe that is at an interval of k subframes after the subframe n includes:

when the third downlink subframe is a subframe n on the first carrier, the to-be-scheduled uplink subframe is a subframe that is at an interval of k subframes after the subframe n on the first carrier; or when the third downlink subframe is a subframe n on the first carrier, the to-be-scheduled uplink subframe is a subframe that is at an interval of k subframes after a subframe n on the second carrier; or when the third downlink subframe is a subframe n on the second carrier, the to-be-scheduled uplink subframe is a subframe that is at an interval of k subframes after a subframe n on the first carrier; or when the third downlink subframe is a subframe n on the second carrier, the to-be-scheduled uplink subframe is a subframe that is at an interval of k subframes after the subframe n on the second carrier.

Optionally, when the subframe configuration for the first carrier is the time division duplex TDD configuration 2, and the subframe configuration for the second carrier is the TDD configuration 2 with a 2-subframe shift, when the third downlink subframe is a subframe n=1 on the first carrier, a value of the subframe interval k of the to-be-scheduled uplink subframe is 4 on the second carrier;

when the third downlink subframe is a subframe n=3 on the first carrier, a value of the subframe interval k of the to-be-scheduled uplink subframe is 4 on the first carrier;

when the third downlink subframe is a subframe n=6 on the first carrier, a value of the subframe interval k of the to-be-scheduled uplink subframe is 4 on the second carrier;

when the third downlink subframe is a subframe n=8 on the first carrier, a value of the subframe interval k of the to-be-scheduled uplink subframe is 4 on the first carrier;

when the third downlink subframe is a subframe n=0 on the second carrier, a value of the subframe interval k of the to-be-scheduled uplink subframe is 4 on the first carrier;

when the third downlink subframe is a subframe n=3 on the second carrier, a value of the subframe interval k of the to-be-scheduled uplink subframe is 4 on the second carrier;

when the third downlink subframe is a subframe n=5 on the second carrier, a value of the subframe interval k of the to-be-scheduled uplink subframe is 4 on the first carrier; and when the third downlink subframe is a subframe n=8 on the second carrier, a value of the subframe interval k of the to-be-scheduled uplink subframe is 4 on the second carrier.

Optionally, when the subframe configuration for the first carrier is the time division duplex TDD configuration 1, and the subframe configuration for the second carrier is the TDD configuration 2 with a 2-subframe shift, when the third downlink subframe is a subframe n=1 on the first carrier, a value of the subframe interval k of the to-be-scheduled uplink subframe is 4 on the second carrier;

when the third downlink subframe is a subframe n=4 on the first carrier, a value of the subframe interval k of the to-be-scheduled uplink subframe is 4 on the first carrier;

when the third downlink subframe is a subframe n=6 on the first carrier, a value of the subframe interval k of the to-be-scheduled uplink subframe is 4 on the second carrier;

when the third downlink subframe is a subframe n=9 on the first carrier, a value of the subframe interval k of the to-be-scheduled uplink subframe is 4 on the first carrier;

when the third downlink subframe is a subframe n=0 on the second carrier, a value of the subframe interval k of the to-be-scheduled uplink subframe is 4 on the first carrier;

when the third downlink subframe is a subframe n=1 on the second carrier, a value of the subframe interval k of the to-be-scheduled uplink subframe is 4 on the first carrier;

when the third downlink subframe is a subframe n=3 on the second carrier, a value of the subframe interval k of the to-be-scheduled uplink subframe is 4 on the second carrier;

when the third downlink subframe is a subframe n=5 on the second carrier, a value of the subframe interval k of the to-be-scheduled uplink subframe is 4 on the first carrier; and when the third downlink subframe is a subframe n=6 on the second carrier, a value of the subframe interval k of the to-be-scheduled uplink subframe is 4 on the first carrier; and when the third downlink subframe is a subframe n=8 on the second carrier, a value of the subframe interval k of the to-be-scheduled uplink subframe is 4 on the second carrier.

A fourth aspect of the embodiments of the present disclosure provides a subframe scheduling apparatus for carrier aggregation, and the apparatus includes modules or means (means) configured to execute the method according to the first aspect and various implementations of the first aspect.

A fifth aspect of the embodiments of the present disclosure provides a subframe scheduling apparatus for carrier aggregation, and the apparatus includes modules or means (means) configured to execute the method according to the second aspect and various implementations of the second aspect.

A sixth aspect of the embodiments of the present disclosure provides a HARQ-based message feedback apparatus, and the apparatus includes modules or means (means) configured to execute the method according to the third aspect and various implementations of the third aspect.

A seventh aspect of the embodiments of the present disclosure provides a subframe scheduling apparatus for carrier aggregation, where the apparatus includes a processor and a memory, the memory is configured to store a program, and the processor invokes the program stored in the memory to execute the method provided in the first aspect of this application.

An eighth aspect of the embodiments of the present disclosure provides a subframe scheduling apparatus for carrier aggregation, where the apparatus includes a processor and a memory, the memory is configured to store a program, and the processor invokes the program stored in the memory to execute the method provided in the second aspect of this application.

A ninth aspect of the embodiments of the present disclosure provides a subframe scheduling apparatus for carrier aggregation, where the apparatus includes a processor and a memory, the memory is configured to store a program, and the processor invokes the program stored in the memory to execute the method provided in the third aspect of this application.

A tenth aspect of the embodiments of the present disclosure provides a subframe scheduling apparatus for carrier aggregation, including at least one processing element (or chip) configured to execute the method provided in the first aspect.

An eleventh aspect of the embodiments of the present disclosure provides a subframe scheduling apparatus for carrier aggregation, including at least one processing element (or chip) configured to execute the method provided in the second aspect.

A twelfth aspect of the embodiments of the present disclosure provides a subframe scheduling apparatus for carrier aggregation, including at least one processing element (or chip) configured to execute the method provided in the third aspect.

A thirteenth aspect of the embodiments of the present disclosure provides a program, and when executed by a processor, the program is used to execute the method in the first aspect.

A fourteenth aspect of the embodiments of the present disclosure provides a program product, for example, a computer readable storage medium, including the program in the thirteenth aspect.

A fifteenth aspect of the embodiments of the present disclosure provides a program, and when executed by a processor, the program is used to execute the method in the second aspect.

A sixteenth aspect of the embodiments of the present disclosure provides a program product, for example, a computer readable storage medium, including the program in the fifteenth aspect.

A seventeenth aspect of the embodiments of the present disclosure provides a program, and when executed by a processor, the program is used to execute the method in the third aspect.

An eighteenth aspect of the embodiments of the present disclosure provides a program product, for example, a computer readable storage medium, including the program in the seventeenth aspect.

In the message feedback method and apparatus for carrier aggregation provided in the embodiments of the present disclosure, the terminal receives, in the first downlink subframe on the carrier aggregation group, the data packet sent by the base station, determines the first timing, based on the mapping relationship between subframe configurations for carrier aggregation groups and timings, then determines the first uplink subframe from subframes on the carrier aggregation group based on the first timing, and sends the feedback message in the first uplink subframe. In this way, the first uplink subframe is determined on the entire carrier group for sending the feedback message, and a selectable range is larger, so that a closer subframe is used for sending the feedback message and feedback efficiency is effectively improved.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may derive other drawings from these accompanying drawings without creative efforts.

DETAILED DESCRIPTION

Figure 1:
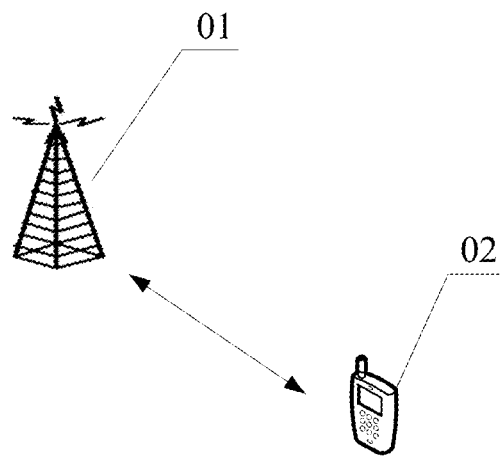
FIG. 1 is a schematic diagram of an application scenario of a message feedback method for carrier aggregation according to the present disclosure.

A base station, also known as a radio access network (RAN) device, is a device that connects a terminal to a radio network. The base station may be a base transceiver station (BTS) in Global System for Mobile Communications (GSM) or Code Division Multiple Access (CDMA), or a NodeB (NB) in Wideband Code Division Multiple Access (WCDMA), or an evolved NodeB (eNB or eNodeB) in Long Term Evolution (LTE), a relay station, an access point, a base station in a future 5G network, or the like. This is not limited herein.

A terminal may be a wireless terminal or a wired terminal. The wireless terminal may refer to a device that provides a user with voice and/or other service data connectivity, a handheld device with a wireless connection function, or other processing devices connected to a wireless modem. The wireless terminal may communicate with one or more core networks through a RAN. The wireless terminal may be a mobile terminal, for example, a mobile phone (or referred to as a "cellular" phone) or a computer provided with a mobile terminal, and may be, for example, a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device or user equipment (UE). The present disclosure is not limited in this sense.

In the embodiments of the present disclosure, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Carrier aggregation (CA) means that two or more component carriers (CC) are aggregated to form a carrier group to support larger transmission bandwidth. A carrier corresponding to a primary cell (Pcell) is referred to as a primary component carrier (PCC), also known as a primary carrier; a carrier corresponding to a secondary cell (Scell) is referred to as a secondary component carrier (SCC), also known as a secondary carrier.

The primary cell is responsible for radio resource control (RRC) between the base station and the terminal, whereas the secondary cell is used to provide additional radio resources, and there is no RRC communication between the secondary cell and the terminal.

A subframe configuration is used to represent quantities and positions of uplink subframes, downlink subframes, and special subframes.

FIG. 1 is a schematic diagram of an application scenario of a message feedback method for carrier aggregation according to the present disclosure. As shown in FIG. 1, the scenario includes a base station 01 and a terminal 02.

In FIG. 1, the terminal 02 can communicate with the base station 01 on a plurality of carriers.

For a downlink HARQ, that is, a processing process of acknowledging, by a terminal, downlink data sent by a base station, there is a timing relationship between sending the downlink data and returning an acknowledgment message. In a time division duplex (Time Division Duplex, TDD for short) scenario, an ACK or a NACK may need to be returned in a same uplink subframe for data packets sent in a plurality of downlink subframes. For example, when the terminal detects a downlink data packet in a subframe n–k (downlink subframe), the terminal returns an ACK or a NACK in a subframe n (uplink subframe). The subframe for returning the ACK or NACK is at an interval of k subframes from the subframe in which the downlink data packet is detected.

For uplink HARQ, that is, a process in which the base station acknowledges uplink data sent by the terminal, there are two uplink timing relationships. One is an uplink data scheduling timing (which may also be referred to as a UL grant timing), indicating that after the terminal detects uplink scheduling information in a subframe n (downlink subframe), the terminal sends physical uplink shared channel (PUSCH) data in a subframe n+k (uplink subframe). The other is an uplink data HARQ acknowledgment message returning timing (which may also be referred to as a physical hybrid ARQ indicator channel (PHICH) timing). Similarly, in the TDD scenario, the base station returns an ACK or a NACK in a subframe n (downlink subframe) when the base station detects an uplink data packet in a subframe n–k (uplink subframe). Herein n is a positive integer greater than or equal to 0, and k is a positive integer greater than 0.

As described above, for individual carriers, there are preset downlink and uplink HARQ timings. The downlink HARQ timing is used as an example. When the terminal detects a downlink data packet in a subframe n–k (downlink subframe), the terminal returns an ACK or a NACK in a subframe n (uplink subframe).

In the prior art, after carrier aggregation, normally, a HARQ timing of an existing carrier is selected, based on different circumstances, as a HARQ timing for a secondary carrier after carrier aggregation.

Figure 2:
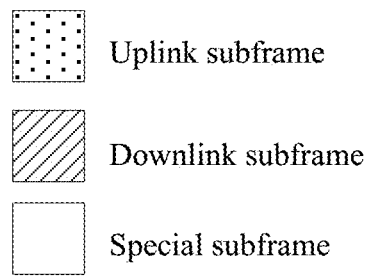
FIG. 2 is a schematic diagram of a subframe configuration in a message feedback method for carrier aggregation according to the present disclosure.
Figure 2:
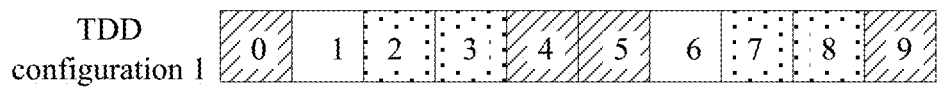
Figure 2:

FIG. 2 is a schematic diagram of a subframe configuration in a message feedback method for carrier aggregation according to the present disclosure.

A downlink HARQ timing is used as an example. Subframe configurations for different carriers in carrier aggregation may be different. If a subframe for returning a feedback message is determined only based on a preset timing of one carrier, on another carrier with a different subframe configuration, an uplink subframe n is also used for message feedback and a downlink subframe n–k is also used for receiving data packets. However, when the selected timing is under a subframe configuration for another carrier, the subframe n–k is not necessarily a downlink subframe, and therefore this downlink subframe cannot be used for data sending. This results in a waste of resources. As shown in FIG. 2, a subframe configuration for a first carrier is the "TDD configuration 1", and a subframe configuration for a second carrier is the "TDD configuration 2". When an SCell uses cross-carrier scheduling, a downlink HARQ timing under the "TDD configuration 1" needs to be used as a HARQ timing of the SCell. Under the configuration 1, a subframe 3 and a subframe 8 are uplink subframes, and therefore the downlink HARQ timing does not include HARQ feedback positions of the two frames. Under the configuration 2, the subframe 3 and the subframe 8 are downlink subframes. As downlink HARQ feedback needs to follow a timing under the configuration 1 of a PCell, because there is no feedback position, the subframe 3 and the subframe 8 of the SCell cannot be used as normal downlink subframes for data sending, causing a waste of resources.

In addition, in a new TDD carrier aggregation scenario (including defining a new subframe configuration format, or translating an existing subframe configuration), uplink subframes on some carriers may be corresponding to downlink subframe positions on some other carriers. If the prior art is used, a waste of resources is caused.

Figure 3:
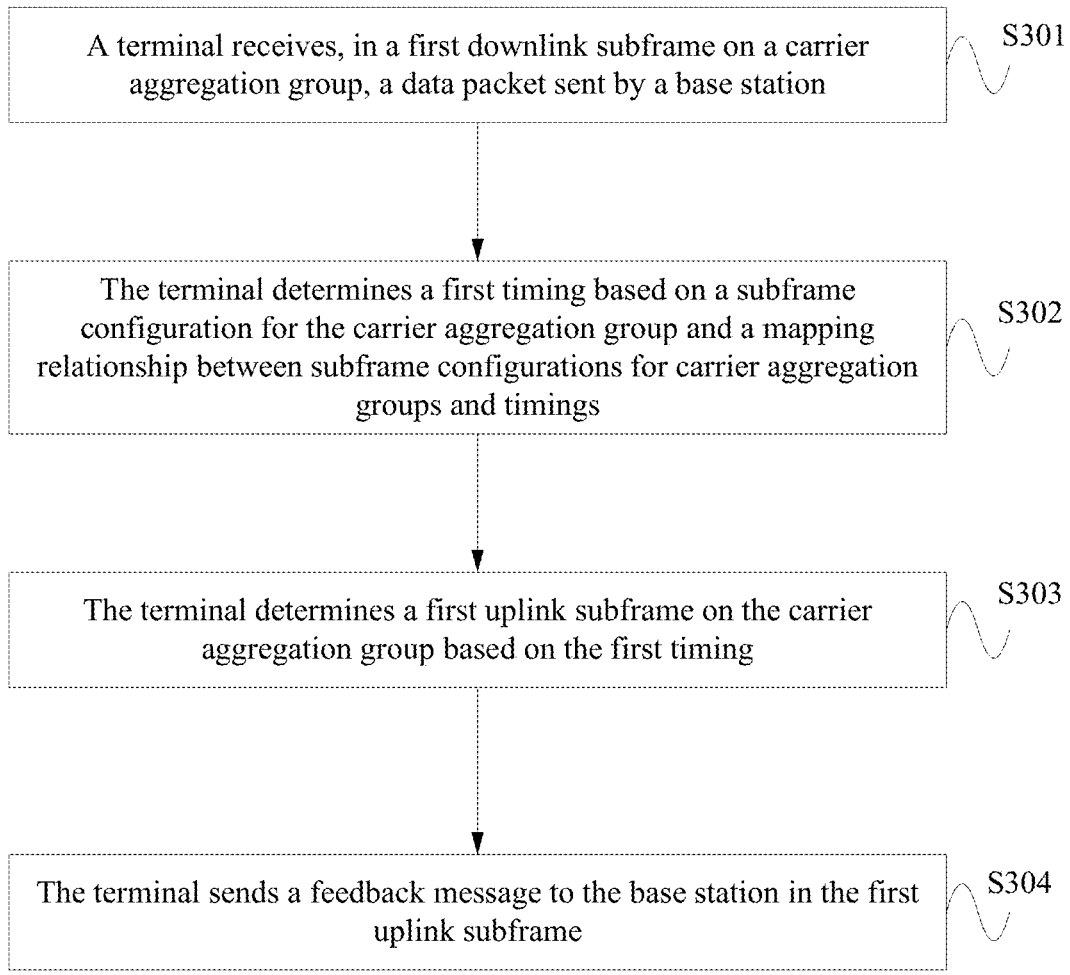
FIG. 3 is a schematic flowchart of a message feedback method for carrier aggregation according to an embodiment of the present disclosure.

FIG. 3 is a schematic flowchart of a message feedback method for carrier aggregation according to an embodiment of the present disclosure. As shown in FIG. 3, the method includes the following steps.

S301: A terminal receives, in a first downlink subframe on a carrier aggregation group, a data packet sent by a base station.

The carrier aggregation group includes a first carrier and a second carrier.

The data packet may be a physical downlink shared channel (PDSCH) data packet, or a physical downlink control channel (PDCCH) data packet used to indicate downlink SPS (Semi-Persistent Scheduling, semi-persistent scheduling) release. This is not limited herein.

The carrier aggregation group may include a plurality of carriers. The first carrier and the second carrier are general concepts.

If in the carrier aggregation group, the plurality of carriers may be further divided into two or more groups, the first carrier and the second carrier belong to a same group.

The first downlink subframe may be any downlink subframe on the first carrier or the second carrier.

S302: The terminal determines a first timing for the carrier aggregation group based on a subframe configuration for the carrier aggregation group and a mapping relationship between subframe configurations for carrier aggregation groups and timings.

S303: The terminal determines a first uplink subframe on the carrier aggregation group based on the first timing.

The subframe configuration for the carrier aggregation group is used to indicate subframe configurations for the plurality of carriers in the carrier aggregation group, and a subframe configuration for a carrier may indicate information such as types, quantities, and arrangement of subframes, for example, a quantity of uplink subframes, a quantity of downlink subframes, a quantity of special subframes on the carrier, and how these subframes are distributed and arranged.

A timing is used to identify a relationship between a downlink subframe for data packet receiving and an uplink subframe used for message feedback.

In this embodiment, subframe configurations for different carrier aggregation groups use different timings. A timing corresponding to the foregoing carrier aggregation group is determined first, and then the first uplink subframe for message feedback is determined based on the timing.

That the first uplink subframe is determined on the carrier aggregation group means that the first uplink subframe may be a subframe on the first carrier or a subframe on the second carrier.

S304: The terminal sends a feedback message to the base station in the first uplink subframe.

In this embodiment, the terminal receives, in the first downlink subframe on the carrier aggregation group, the data packet sent by the base station, determines the first timing for the carrier aggregation group based on the mapping relationship between subframe configurations for carrier aggregation groups and timings, then determines the first uplink subframe on the carrier aggregation group based on the first timing, and sends the feedback message in the first uplink subframe. In this way, the first uplink subframe is determined on the entire carrier group for sending the feedback message, and a selectable range is larger, so that a closer subframe is used for sending the feedback message and feedback efficiency is effectively improved.

That the terminal determines the first timing for the carrier aggregation group based on the subframe configuration for the carrier aggregation group and the mapping relationship between subframe configurations for carrier aggregation groups and timings may be: The terminal obtains the subframe configuration information for the carrier aggregation group, and determines a first preset timing, based on the subframe configuration information for the carrier aggregation group and the mapping relationship between subframe configurations and timings.

The subframe configuration may include a subframe configuration for the first carrier and/or a subframe configuration for the second carrier.

Optionally, the subframe configuration for the first carrier and/or the subframe configuration for the second carrier are/is a subframe configuration(s) other than the existing TDD subframe configurations 0 to 6. Specifically, a configuration for at least one of the first carrier and the second carrier is a new subframe configuration.

Optionally, the terminal may preconfigure a plurality of timings, and determine the first timing of the carrier aggregation group based on the subframe configuration for the carrier aggregation group and the mapping relationship between subframe configurations for carrier aggregation groups and timings. It should be noted that these timings are stored in both the terminal and the base station, so that the terminal and the base station use a same timing for communication.

Optionally, the terminal may inform the base station after determining the first timing.

Optionally, the terminal may determine a primary carrier during establishment of a connection, and reads a system message, for example, a system information block (system information block, SIB for short), sent by a base station corresponding to the primary cell. Specifically, the system message may be a SIB1. The terminal obtains a subframe configuration for the primary carrier based on the system message.

The terminal may receive a radio resource control (RRC) connection reconfiguration message, and adds, modifies, or releases a secondary cell according to the RRC connection reconfiguration message, and reads a subframe configuration for a secondary carrier from the RRC connection reconfiguration message.

It should be noted that the first carrier may be a primary carrier or a secondary carrier. Likewise, the second carrier may be a primary carrier or a secondary carrier. This is not limited herein.

The first timing may indicate an interval between the first downlink subframe and the first uplink subframe. It should be noted that this interval may be an interval between subframes on one carrier or an interval between different carriers.

Optionally, the first timing is used to indicate that a quantity of subframes in an interval between the first downlink subframe and the first uplink subframe is k, where k is a positive integer greater than 0.

The first timing is used to indicate that when the first uplink subframe is a subframe n, the first downlink subframe is a subframe that is at an interval of k subframes before the subframe n. This specifically includes the following cases:

(1) when the first uplink subframe is a subframe n on the first carrier, the first downlink subframe is a subframe that is at an interval of k subframes before the subframe n on the first carrier;

(2) when the first uplink subframe is a subframe n on the first carrier, the first downlink subframe is a subframe that is at an interval of k subframes before the subframe n on the second carrier;

(3) when the first uplink subframe is a subframe n on the second carrier, the first downlink subframe is a subframe that is at an interval of k subframes before the subframe n on the first carrier;

(4) when the first uplink subframe is a subframe n on the second carrier, the second downlink subframe is a subframe that is at an interval of k subframes before the subframe n on the first carrier.

Optionally, k is greater than or equal to 4.

For downlink HARQ, values of the subframe interval k corresponding to different subframe configurations for the carrier aggregation group may be shown in Table 1.

received in a subframe on the carrier 2, a corresponding value of k is one or more of 6, 5, and 4. To be specific, a feedback message sent in a subframe 2 on the carrier 1 may be corresponding to a data packet received in one or more downlink subframes that are 6, 5, or 4 subframes before on the carrier 1. For the carrier 2, when an uplink subframe with n being 2 is used for feedback about a data packet received in a downlink subframe on the carrier 1, a corresponding value of k is 6 and/or 5. To be specific, a feedback message sent in a subframe 2 on the carrier 2 may be corresponding to a data packet received in a downlink subframe that is 6 and/or 5 subframes on the carrier 2. When an uplink subframe with n being 2 is used for feedback about a data packet received in a subframe on the carrier 2, a corresponding value of k is 6. To be specific, a feedback message sent in a subframe 2 on the carrier 2 may be corresponding to a

TABLE 1

| Subframe configuration for carrier aggregation group | | Subframe n | | | | | | |
|---|---|---|---|---|---|---|---|---|
| | | 0  1  2 | 3 | 4 | 5  6  7 | 8 | 9 |
| Configuration 2 + configuration 2 (shift 2): k | Carrier 1 | Carrier 1: 6 and 4 Carrier 2: 6, 5, and 4 | | | Carrier 1: 4 Carrier 2: 5 and 4 | | |
| | Carrier 2 | Carrier 1: 6 and 5 Carrier 2: 6 | | | Carrier 1: 6, 5, and 4 Carrier 2: 6 and 4 | | |
| Configuration 1 + configuration 1 (shift 2): k | Carrier 1 | Carrier 2: 4 | Carrier 1: 4 Carrier 2: 4 | | Carrier 2: 4 | Carrier 1: 4 Carrier 2: 4 | |
| | Carrier 2 | Carrier 1: 5 and 4 | Carrier 2: 4 | | Carrier 1: 5 and 4 | Carrier 2: 4 | |
| Configuration 1 + configuration 0 (shift 3): k | Carrier 1 | Carrier 2: 4 | Carrier 1: 4 | | Carrier 2: 4 | Carrier 1: 4 | |
| | Carrier 2 | Carrier 1: 4 | Carrier 1: 4 Carrier 2: 4 | | Carrier 1: 4 | Carrier 1: 4 | Carrier 2: 4 |
| Configuration 2 + configuration 0 (shift 3): k | Carrier 1 | Carrier 1: 4 Carrier 2: 4 | | | Carrier 1: 4 Carrier 2: 4 | | |
| | Carrier 2 | Carrier 1: 4 and 5 | Carrier 1: 4 Carrier 2: 4 | | Carrier 1: 4 and 5 | Carrier 1: 4 | Carrier 2: 4 |
| Configuration 1 + configuration 2 (shift 2): k | Carrier 1 | Carrier 2: 5 and 4 | Carrier 1: 4 Carrier 2: 4 | | Carrier 2: 5 and 4 | Carrier 1: 4 Carrier 2: 4 | |
| | Carrier 2 | Carrier 1: 5 and 4 Carrier 2: 4 | | | Carrier 1: 5 and 4 Carrier 2: 4 | | |

Table 1 is described by using a first row as an example. "Configuration 2+configuration 2 (shift 2)" indicates that a subframe configuration for the first carrier (denoted as a carrier 1) is the "TDD configuration 2", and a subframe configuration for the second carrier (denoted as a carrier 2) is the "TDD configuration 2 with a 2-subframe shift". For the carrier 1, when an uplink subframe with n being 2 is used for feedback about a data packet received in a downlink subframe on the carrier 1, a corresponding value of k is 6 and/or 4. To be specific, a feedback message sent in a subframe 2 on the carrier 1 may be corresponding to a data packet received in a downlink subframe that is 6 and/or 4 subframes before on the carrier 1. When an uplink subframe with n being 2 is used for feedback about a data packet data packet received in a downlink subframe that is 6 subframes before on the carrier 2.

For all other rows, reference may be made to the foregoing description, and no more details are described herein.

Using a process 0 as an example, Table 2 shows a timing for data packet receiving and feedback message sending, where a configuration for a first carrier is the "TDD configuration 2", a configuration for a second carrier is the "TDD configuration 0". In Table 2, "D" represents a downlink subframe, "S" represents a special subframe, and "U" represents an uplink subframe.

TABLE 2

| Subframe n on first carrier | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Process number 0 | D Tx | S | U | D | D | D | S | U | D | D | D Tx | S | U | D | D | D | S | U | D | D |
| Subframe n on second carrier | 0 | 1 | 2 | 3 | 4 | 5 | 6 | 7 | 8 | 9 | 0 | 1 | 2 | 3 | 4 | 5 | 6 | 7 | 8 | 9 |
| Process number 0 | D | S | U | U | U ACK | D | S | U | U | U | D | S | U | U | U ACK | D | S | U | U | U |

As shown in Table 2, a quantity of uplink subframes in subframes on the second carrier is larger than a quantity of uplink subframes in subframes on the first carrier, and a data packet (denoted by Tx) is received in a $1^{st}$ downlink subframe with n being 0 on the first carrier. According to the prior art, a feedback message needs to be sent in uplink subframes that are at an interval of 4 or more subframes on the first carrier. In this case, the feedback message can be sent earliest in a $1^{st}$ uplink subframe with n being 7 on the first carrier. As a result, a retransmitted data packet can be received only in a downlink subframe at a much larger interval behind. However, in this embodiment, subframes on both the first carrier and the second carrier may be used for sending the feedback message. The feedback message can be sent in a $1^{st}$ uplink subframe with n being 4 on the second carrier, and the retransmitted data packet can be received in a $2^{nd}$ downlink subframe with n being 0 on the first carrier. This greatly shortens a round trip time (RTT).

Using a process 0 as an example, Table 3 shows a timing for data packet receiving and feedback message sending, where a subframe configuration for a first carrier is the "TDD configuration 2", a subframe configuration for a second carrier is the "TDD configuration 0 with a 3-subframe shift (denoted as a configuration 0 (shift 3))". In Table 3, "D" represents a downlink subframe, "S" represents a special subframe, and "U" represents an uplink subframe.

packet is received only in a $1^{st}$ downlink subframe with n being 0 on the first carrier, and an ACK is sent in an uplink subframe with n being 7 on the second carrier to feed back that a data packet is received on the $1^{st}$ downlink subframe with n being 0 on the first carrier. Likewise, an ACK is sent in a $2^{nd}$ uplink subframe with n being 7 on the second carrier to feed back that a data packet is received on a $2^{nd}$ downlink subframe with n being 9 on the first carrier. If the feedback message is sent in an uplink subframe on the first carrier, and k is greater than or equal to 4, for a data packet received in a $1^{st}$ downlink subframe with n being 0 on the first carrier, an ACK can be returned only in the second uplink subframe with n being 7 on the first carrier. Therefore, it can be learned that the method in this embodiment greatly shortens the RTT.

Likewise, for a data packet received in a subframe on the second carrier, a feedback message can also be sent in a subframe on the first carrier or the second carrier. Referring to Table 1, for a data packet received in a $1^{st}$ downlink subframe with n being 0 on the second carrier, an ACK is returned in a $1^{st}$ uplink subframe with n being 4 on the second carrier. If the prior art is used, for a data packet received in a subframe on the second carrier, a feedback message can also be sent in a subframe on the first carrier.

TABLE 3

| Subframe n on first carrier | 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|---|
| Process number 0 | U | D | D | D Tx | S | U | D | D | D | S | U | D | D | D Tx | S | U | D | D | D | S |
| Subframe n on second carrier | 0 | 1 | 2 | 3 | 4 | 5 | 6 | 7 | 8 | 9 | 0 | 1 | 2 | 3 | 4 | 5 | 6 | 7 | 8 | 9 |
| Process number 0 | D Tx | S | U | U | U ACK | D | S | U ACK | U | U | D Tx | S | U | U | U ACK | D | S | U ACK | U | U |

Referring to Table 3, a data packet is received in a $1^{st}$ downlink subframe with n being 0 on the first carrier. It can be deduced from Table 1 that a feedback message can be sent in a $1^{st}$ uplink subframe with n being 7 on the second carrier. Specifically, it can be learned from Table 1 that an uplink subframe with n being 7 on the second carrier is used for responding to a data packet received in subframes that are 4 and 5 subframes before on the first carrier. For data packets received in a $1^{st}$ downlink subframe with n being 9 and in a $1^{st}$ downlink subframe with n being 0 on the first carrier, feedback messages can be sent in a $1^{st}$ uplink substream with n being 7 on the second carrier. In the process 0, a data For a data packet received in a $1^{st}$ downlink subframe with n being 0 on the second carrier, a feedback message can be sent earliest in a $1^{st}$ uplink subframe with n being 2 on the first carrier. Therefore, it can be learned that the method in this embodiment greatly shortens the RTT.

Figure 4:
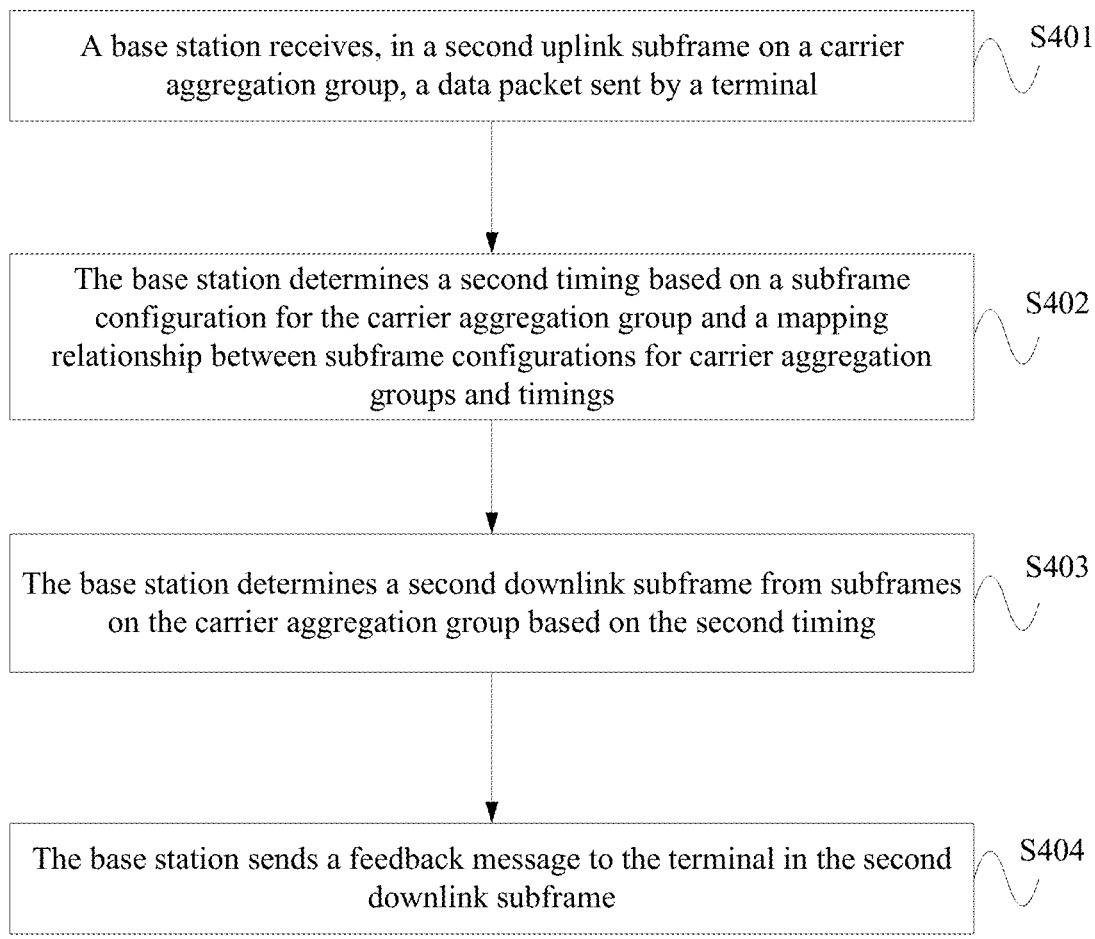
FIG. 4 is a schematic flowchart of another message feedback method for carrier aggregation according to an embodiment of the present disclosure.

FIG. 4 is a schematic flowchart of another message feedback method for carrier aggregation according to an embodiment of the present disclosure. Similar to the foregoing embodiment, in a HARQ process, after receiving a data packet sent by a terminal, a base station needs to send a feedback message. As shown in FIG. 4, the method includes the following steps.

S401: A base station receives, in a second uplink subframe on a carrier aggregation group, a data packet sent by a terminal.

The carrier aggregation group includes a first carrier and a second carrier.

The data packet may be a physical uplink shared channel (PUSCH) data packet. This is not limited herein.

The second uplink subframe may be any uplink subframe on the first carrier or the second carrier.

S402: The base station determines a second timing, based on a subframe configuration for the carrier aggregation group and a mapping relationship between subframe configurations for carrier aggregation groups and timings.

S403: The base station determines a second downlink subframe from subframes on the carrier aggregation group based on the second timing.

The subframe configuration for the carrier aggregation group is used to indicate subframe configurations for carriers in the carrier aggregation group. The subframe configuration for the carrier aggregation group may specifically indicate a subframe configuration for each carrier in the carrier aggregation group. The subframe configuration may indicate types, quantities, arrangement, and the like of subframes, for example, a quantity of uplink subframes, a quantity of downlink subframes, a quantity of special subframes on the carrier, and how these subframes are distributed and arranged.

A timing is used to identify a relationship between a downlink subframe for data packet receiving and an uplink subframe used for message feedback.

The second downlink subframe may be a subframe on the first carrier or a subframe on the second carrier.

S404: The base station sends a feedback message to the terminal in the second downlink subframe.

In this embodiment, the base station receives, in the second uplink subframe on the carrier aggregation group, the data packet sent by the terminal, determines the second timing, based on the subframe configuration for the carrier aggregation group and the mapping relationship between subframe configurations for carrier aggregation groups and timings, then determines the second downlink subframe on the carrier aggregation group based on the second timing, and sends the feedback message in the second downlink subframe. In this way, the second downlink subframe is determined on the entire carrier group for sending the feedback message, and a selectable range is larger, so that a closer subframe is used for sending the feedback message and feedback efficiency is effectively improved.

Optionally, that the base station determines the second timing, based on the subframe configuration for the carrier aggregation group and the mapping relationship between subframe configurations for carrier aggregation groups and timings may be: The base station obtains the subframe configuration information for the carrier aggregation group, and then determines the second timing, based on the subframe configuration information for the carrier aggregation group and the mapping relationship between subframe configurations and timings.

The subframe configuration may include a subframe configuration for the first carrier and/or a subframe configuration for the second carrier.

Optionally, the subframe configuration for the first carrier and/or the subframe configuration for the second carrier are/is a subframe configuration(s) other than the existing TDD subframe configurations 0 to 6. Specifically, a configuration for at least one of the first carrier and the second carrier is a new subframe configuration.

Optionally, the base station may preconfigure a plurality of timings, and determine the second timing for the carrier aggregation group based on the subframe configuration for the carrier aggregation group and the mapping relationship between subframe configurations for carrier aggregation groups and timings. It should be noted that these timings are stored in both the terminal and the base station, so that the terminal and the base station use a same timing for communication.

After determining the second timing, the base station may inform the terminal. Specifically, the base station may inform the terminal by using higher layer signaling, and this is not limited herein.

The second timing may indicate an interval between the second downlink subframe and the second uplink subframe. It should be noted that this interval may be an interval between subframes on one carrier or an interval between different carriers.

Further, the second timing may indicate that when the second downlink subframe is a subframe n, the second uplink subframe is a subframe that is at an interval of k subframes before the subframe n, where n is a positive integer greater than or equal to 0, and k is a positive integer greater than 0.

Specifically, this may include the following cases:

(1) when the second downlink subframe is a subframe n on the first carrier, the second uplink subframe is a subframe that is at an interval of k subframes before the subframe n on the first carrier;

(2) when the second downlink subframe is a subframe n on the first carrier, the second uplink subframe is a subframe that is at an interval of k subframes before the subframe n on the second carrier;

(3) when the second downlink subframe is a subframe n on the second carrier, the second downlink subframe is a subframe that is at an interval of k subframes before the subframe n on the first carrier;

(4) when the second downlink subframe is a subframe n on the second carrier, the second downlink subframe is a subframe that is at an interval of k subframes before the subframe n on the second carrier.

Optionally, k is greater than or equal to 4.

For uplink HARQ, values of the subframe interval k corresponding to different subframe configurations for the carrier aggregation group may be shown in Table 4.

TABLE 4

| Subframe configuration for carrier aggregation group | Subframe n | | | | | | | | | |
|---|---|---|---|---|---|---|---|---|---|---|
| | 0 | 1 | 2 | 3 | 4 | 5 | 6 | 7 | 8 | 9 |
| Configuration 2 + configuration 2 (shift 2): k | Carrier 1 | | Carrier 2: 6 | Carrier 1: 6 | | | Carrier 2: 6 | | Carrier 1: 6 | |
| | Carrier 2 | Carrier 1: 6 | | Carrier 2: 6 | | Carrier 1: 6 | | | Carrier 2: 6 | |
| Configuration 1 + configuration 1 (shift 2): k | Carrier 1 | | Carrier 2: 5 | | Carrier 1: 4 | | Carrier 2: 5 | | | Carrier 2: 4 |
| | Carrier 2 | Carrier 1: 5 | Carrier 2: 4 | | Carrier 1: 5 | Carrier 1: 5 | Carrier 1: 4 | | | Carrier 1: 5 |
| Configuration 1 + configuration 0 (shift 3): k | Carrier 1 | Carrier 2: 4 | Carrier 1: 4 | | Carrier 2: 4 | Carrier 2: 4 | Carrier 1: 4 | | | Carrier 2: 4 |
| | Carrier 2 | Carrier 1: 4 | Carrier 2: 4 | | | Carrier 1: 4 | Carrier 2: 4 | | | |
| Configuration 2 + configuration 0 (shift 3): k | Carrier 1 | Carrier 2: 5 | Carrier 2: 5 | Carrier 2: 4 | | | Carrier 2: 5 | Carrier 2: 6 | | Carrier 2: 4 |
| | Carrier 2 | Carrier 1: 5 | Carrier 2: 4 | | | | Carrier 1: 5 | Carrier 2: 4 | | |
| Configuration 1 + configuration 2 (shift 2): k | Carrier 1 | | Carrier 1: 4 | | Carrier 2: 4 | | Carrier 2: 4 | | | Carrier 2: 4 |
| | Carrier 2 | Carrier 1: 5 | Carrier 2: 4 | Carrier 1: 4 | | Carrier 1: 5 | Carrier 2: 4 | Carrier 2: 4 | | |

Table 1 is described by using a first row as an example. "Configuration 2+configuration 2 (shift 2)" indicates that a subframe configuration for the first carrier (denoted as a carrier 1) is the "TDD configuration 2", and a subframe configuration for the second carrier (denoted as a carrier 2) is the "TDD configuration 2 with a 2-subframe shift". For the carrier 1, when a downlink subframe with n being 1 is used for feedback about a data packet received in an uplink subframe on the carrier 2, a corresponding value of k is 6. To be specific, a feedback message sent in a subframe 1 on the carrier 1 may be corresponding to a data packet received in an uplink subframe that is 6 subframes before on the carrier 2. For the carrier 2, when a downlink subframe with n being 0 is used for feedback about a data packet received in an uplink subframe on the carrier 1, a corresponding value of k is 6. To be specific, a feedback message sent in a subframe 1 on the carrier 2 may be corresponding to a data packet received in an uplink subframe that is 6 subframes before on the carrier 1.

For all other rows, reference may be made to the foregoing description, and no more details are described herein.

Using a process 0 as an example, Table 5 shows a timing for data packet receiving and feedback message sending, where a configuration for a first carrier is the "TDD configuration 2", a configuration for a second carrier is the "TDD configuration 0 with a 3-subframe shift (marked as a configuration 0 (shift 3))". In Table 5, "D" represents a downlink subframe, "S" represents a special subframe, and "U" represents an uplink subframe.

Refer to Table 4 and Table 5. A data packet is received in a $1^{st}$ uplink subframe with n being 7 on the first carrier. It can be deduced from Table 4 that a feedback message ACK can be sent in a $1^{st}$ downlink subframe with n being 5 on the second carrier. If the feedback message is sent in a subframe on the first carrier, and k is greater than or equal to 4, the feedback message can be sent earliest in a $1^{st}$ downlink subframe with n being 3 on the first carrier. Further, for a retransmitted data packet received in a $1^{st}$ special subframe with n being 6 on the first carrier, a feedback message ACK is sent in a $2^{nd}$ downlink subframe with n being 0 on the first carrier. It can be learned that in the method in this embodiment, subframes on both the first carrier and the second carrier can be used for sending a feedback message, and an RTT is shortened.

Further, cross-carrier scheduling in carrier aggregation is a special resource scheduling manner under CA, and means that resources of one carrier are scheduled by another carrier.

Non cross-carrier scheduling means that resources of a carrier are scheduled by a control channel of the carrier itself.

Carrier indicator field (CIF) based cross-carrier scheduling allows a PDCCH of one serving cell to schedule radio resources on another serving cell. Control information is transmitted on one carrier unit (a subframe on a carrier), whereas corresponding data is transmitted on another carrier unit. To be specific, a PDCCH is transmitted on one cell, but a corresponding PDSCH or physical uplink shared channel (PUSCH). Usually, a primary cell is scheduled by using a

TABLE 5

| Subframe n on first carrier | 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|---|
| Process number 0 | U Tx | D | D | D | S | U | D | D | D | S | U Tx | D | D | D | S ACK | U | D | D | D | S |
| Subframe n on second carrier | 0 | 1 | 2 | 3 | 4 | 5 | 6 | 7 | 8 | 9 | 0 | 1 | 2 | 3 | 4 | 5 | 6 | 7 | 8 | 9 |
| Process number 0 | D | S | U | U | U | D ACK | S | U | U | U | D | S | U | U | U | D | S | U | U | U |

PDCCH of the primary cell, whereas when not configured with a PDCCH, a secondary cell is scheduled by using a PDCCH of another serving cell.

If a terminal supports carrier aggregation, a plurality of serving cells corresponding to this terminal may have the following several configurations: (1) A serving cell does not schedule resources on another serving cell in a cross-carrier manner, and resources of the serving sell are not scheduled by another serving cell either. That is, the serving cell sends only a PDCCH of this cell. (2) A serving cell may schedule resources on another serving cell in a cross-carrier manner, but does not support scheduling by another serving cell in a cross-carrier manner. That is, the service cell can send both a PDCCH of this cell and a PDCCH of another cell. (3) Resources of a serving cell may be scheduled by another serving cell in a cross-carrier manner, but the serving cell cannot schedule resources of another serving cell. That is, the serving cell can send neither a PDCCH of this cell or a PDCCH of another cell.

Figure 5:
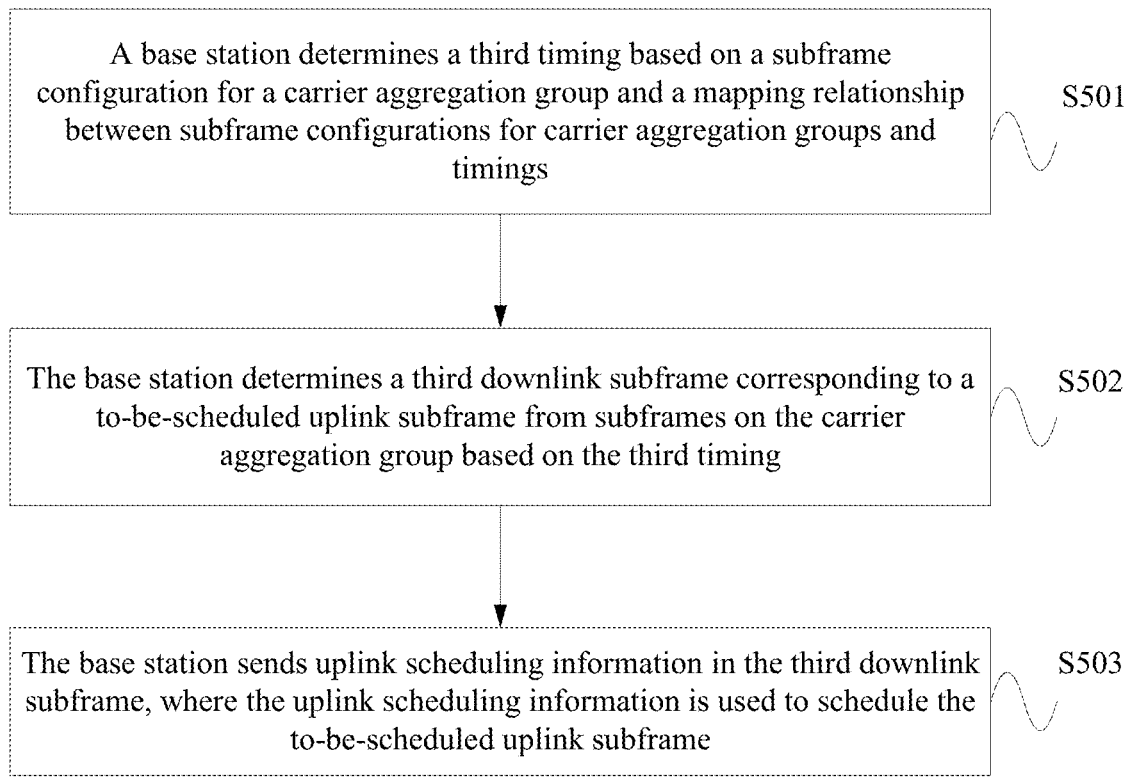
FIG. 5 is a schematic flowchart of another subframe scheduling method for carrier aggregation according to an embodiment of the present disclosure.

FIG. 5 is a schematic flowchart of another subframe scheduling method for carrier aggregation according to an embodiment of the present disclosure. On a basis of the foregoing embodiment, in a case of cross-carrier scheduling, carrier scheduling needs to be performed first. In this embodiment, a base station schedules subframes based on a specific timing. As shown in FIG. 5, the method includes the following steps.

S501: A base station determines a third timing, based on a subframe configuration for a carrier aggregation group and a mapping relationship between subframe configurations for carrier aggregation groups and timings.

The carrier aggregation group includes a first carrier and a second carrier.

For related content about the carrier aggregation group, reference may be made to the foregoing embodiments, and details are not described herein again.

Optionally, the base station informs a terminal of the determined third timing so that both the base station and the terminal use the same timing for communication.

S502: The base station determines a third downlink subframe corresponding to a to-be-scheduled uplink subframe from subframes on the carrier aggregation group based on the third timing.

S503: The base station sends uplink scheduling information in the third downlink subframe, where the uplink scheduling information is used to schedule the to-be-scheduled uplink subframe.

In this embodiment, the base station determines the third timing, based on the subframe configuration for the carrier aggregation group and the mapping relationship between subframe configurations for carrier aggregation groups and timings, determines the third downlink subframe corresponding to the to-be-scheduled uplink subframe from subframes on the carrier aggregation group based on the third timing, and further sends the uplink scheduling information in the third downlink subframe to schedule the to-be-scheduled uplink subframe. In this way, the third downlink subframe is determined on the entire carrier group for sending the uplink scheduling information, and a selectable range is larger, so that a closer subframe is used for scheduling and feedback efficiency is effectively improved.

Optionally, that the base station determines the third timing, based on the subframe configuration for the carrier aggregation group and the mapping relationship between subframe configurations for carrier aggregation groups and timings may include: The base station obtains the subframe configuration for the carrier aggregation group, and determines the third timing, based on the subframe configuration information for the carrier aggregation group and the mapping relationship between subframe configurations and timings. The subframe configuration for the carrier aggregation group includes a subframe configuration for the first carrier and/or a subframe configuration for the second carrier.

Optionally, the subframe configuration for the first carrier and/or the subframe configuration for the second carrier are/is a subframe configuration(s) other than the existing TDD subframe configurations 0 to 6. Specifically, a configuration for at least one of the first carrier and the second carrier is a new subframe configuration.

Optionally, the base station may preconfigure a plurality of timings, and determine the third timing of the carrier aggregation group based on the subframe configuration for the carrier aggregation group and the mapping relationship between subframe configurations for carrier aggregation groups and timings. It should be noted that these timings are stored by both the terminal and the base station, so that the terminal and the base station use a same timing for communication.

The third timing may indicate an interval k between the to-be-scheduled uplink subframe and the third downlink subframe. It should be noted that this interval may be an interval between subframes on one carrier or an interval between different carriers.

Further, the third timing is used to indicate that when the third downlink subframe is a subframe n, the to-be-scheduled uplink subframe is a subframe that is at an interval of k subframes after the subframe n, where n is a positive integer greater than or equal to 0, and k is a positive integer greater than 0.

Specifically, this may include the following cases:

(1) when the third downlink subframe is a subframe n on the first carrier, the to-be-scheduled uplink subframe is a subframe that is at an interval of k subframes after the subframe n on the first carrier;

(2) when the third downlink subframe is a subframe n on the first carrier, the to-be-scheduled uplink subframe is a subframe that is at an interval of k subframes after a subframe n on the second carrier;

(3) when the third downlink subframe is a subframe n on the second carrier, the to-be-scheduled uplink subframe is a subframe that is at an interval of k subframes after a subframe n on the first carrier;

(4) when the third downlink subframe is a subframe n on the second carrier, the to-be-scheduled uplink subframe is a subframe that is at an interval of k subframes after the subframe n on the second carrier;

Optionally, k is greater than or equal to 4.

Optionally, values of the subframe interval k corresponding to different subframe configurations for the carrier aggregation group may be shown in Table 6.

TABLE 6

| Subframe configuration for carrier aggregation group | | Subframe n | | | | | | | | | |
|---|---|---|---|---|---|---|---|---|---|---|---|
| | | 0 | 1 | 2 | 3 | 4 | 5 | 6 | 7 | 8 | 9 |
| Configuration 2 + configuration 2 (shift 2): k | Carrier 1 | | | Carrier 2: 4 | Carrier 1: 4 | | | Carrier 2: 4 | Carrier 1: 4 | | |
| | Carrier 2 | | Carrier 1: 4 | | | Carrier 2: 4 | Carrier 1: 4 | | | Carrier 2: 4 | |
| Configuration 1 + configuration 1 (shift 2): k | Carrier 1 | | | Carrier 2: 4 | | Carrier 1: 4 | | Carrier 2: 4 | | | Carrier 1: 4 |
| | Carrier 2 | | Carrier 1: 4 | Carrier 1: 4 | | Carrier 2: 4 | Carrier 1: 4 | Carrier 1: 4 | | Carrier 2: 4 | |
| Configuration 1 + configuration 0 (shift 3): k | Carrier 1 | | Carrier 2: 4 | Carrier 2: 4 | | Carrier 1: 4 | Carrier 2: 4 | Carrier 2: 4 | | | Carrier 1: 4 |
| | Carrier 2 | | Carrier 2: 4 | Carrier 1: 4 | | | Carrier 2: 4 | Carrier 1: 4 | | | |
| Configuration 2 + configuration 0 (shift 3): k | Carrier 1 | | Carrier 2: 4 | Carrier 2: 4 | Carrier 1: 4 | | Carrier 2: 4 | Carrier 2: 4 | Carrier 1: 4 | | |
| | Carrier 2 | | Carrier 2: 4 | Carrier 1: 4 | | | Carrier 2: 4 | Carrier 1: 4 | | | |
| Configuration 1 + configuration 2 (shift 2): k | Carrier 1 | | | Carrier 2: 4 | | Carrier 1: 4 | | Carrier 2: 4 | | | Carrier 1: 4 |
| | Carrier 2 | | Carrier 1: 4 | Carrier 1: 4 | Carrier 2: 4 | | Carrier 1: 4 | Carrier 1: 4 | Carrier 2: 4 | | |

Table 1 is described by using a first row as an example. "Configuration 2+configuration 2 (shift 2)" indicates that a subframe configuration for the first carrier (denoted as a carrier 1) is the "TDD configuration 2", and a subframe configuration for the second carrier (denoted as a carrier 2) is the "TDD configuration 2 with a 2-subframe shift".

For the carrier 1, when a downlink subframe with n being 1 is used to schedule an uplink subframe on the second carrier, a corresponding value of k is 6. To be specific, uplink scheduling information sent in a subframe 1 on the carrier 1 is used to schedule an uplink subframe that is 6 subframes after on the carrier 2. For the carrier 2, when a downlink subframe with n being 0 is used to schedule an uplink subframe on the first carrier, a corresponding value of k is 4. To be specific, uplink scheduling information sent in a subframe 0 on the carrier 2 is used to schedule an uplink subframe that is 4 subframes after on the carrier 1.

For all other rows, reference may be made to the foregoing description, and no more details are described herein.

Table 7 shows an uplink subframe scheduling timing, where a configuration for a first carrier is the "TDD configuration 2", a configuration for a second carrier is the "TDD configuration 0 with a 3-subframe shift (marked as a configuration 0 (shift 3))". In Table 7, "D" represents a downlink subframe, "S" represents a special subframe, and "U" represents an uplink subframe.

scheduled, uplink scheduling information is sent in a $1^{st}$ downlink subframe with n being 0 on the first carrier; when a $2^{nd}$ uplink subframe with n being 4 on the second carrier is scheduled, uplink scheduling information is sent in a $2^{nd}$ downlink subframe with n being 0 on the second carrier. It can be learned that an RTT can be shortened by flexibly selecting a downlink subframe from subframes on the first carrier and the second carrier for sending uplink scheduling information.

Figure 6:
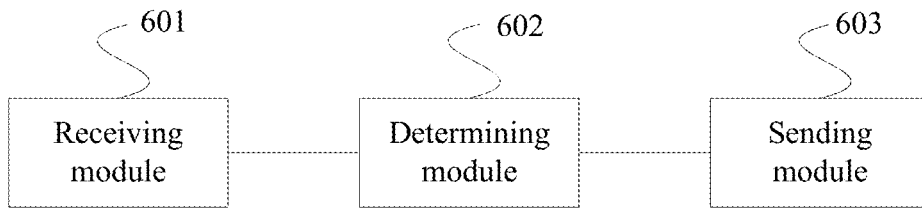
FIG. 6 is a schematic structural diagram of a message feedback apparatus for carrier aggregation according to an embodiment of the present disclosure.

FIG. 6 is a schematic structural diagram of a message feedback apparatus for carrier aggregation according to an embodiment of the present disclosure. The apparatus may be integrated into a terminal. As shown in FIG. 6, the apparatus includes a receiving module 601, a determining module 602, and a sending module 603, where the receiving module 601 is configured to receive, in a first downlink subframe on a carrier aggregation group, a data packet sent by a base station, where the carrier aggregation group includes a first carrier and a second carrier;

the determining module 602 is configured to determine a first timing, based on a subframe configuration for the carrier aggregation group and a mapping relationship between subframe configurations for carrier aggregation groups and timings; and determine a first uplink subframe from subframes on the carrier aggregation group based on the first timing; and

TABLE 7

| Subframe n on first carrier | 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|---|
| | U | D | D | D Schedule | S | U | D | D | D | S | U | D | D | D | S | U | D | D | D | S |
| Subframe n on second carrier | 0 | 1 | 2 | 3 | 4 | 5 | 6 | 7 | 8 | 9 | 0 | 1 | 2 | 3 | 4 | 5 | 6 | 7 | 8 | 9 |
| Process number 0 | D | S | U | U | U | D | S | U Scheduled | U | U | D Schedule | S | U | U | U Scheduled | D | S | U | U | U |

It can be learned from Table 6 and Table 7 that when a $1^{st}$ uplink subframe with n being 7 on the second carrier is the sending module 603 sends a feedback message to the base station in the first uplink subframe.

Optionally, the determining module 602 is specifically configured to obtain the subframe configuration information for the carrier aggregation group, where the subframe configuration for the carrier aggregation group includes a subframe configuration for the first carrier and/or a subframe configuration for the second carrier; and determine the first timing, based on the subframe configuration information for the carrier aggregation group and the mapping relationship between subframe configurations for carrier aggregation groups and timings.

The apparatus may be configured to execute the method in the foregoing method embodiments. Specific implementations and technical effects thereof are similar to those of the method, and details are not described herein again.

Figure 7:
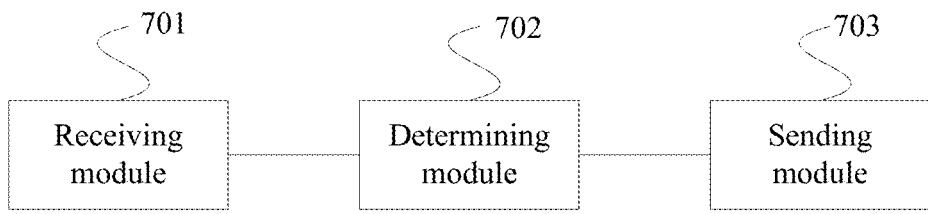
FIG. 7 is a schematic structural diagram of another message feedback apparatus for carrier aggregation according to an embodiment of the present disclosure.

FIG. 7 is a schematic structural diagram of another message feedback apparatus for carrier aggregation according to an embodiment of the present disclosure. The apparatus may be integrated into a base station. As shown in FIG. 7, the apparatus includes a receiving module 701, a determining module 702, and a sending module 703, where the receiving module 701 is configured to receive, in a second uplink subframe on a carrier aggregation group, a data packet sent by a terminal, where the carrier aggregation group includes a first carrier and a second carrier;

the determining module 702 determines a second timing, based on a subframe configuration for the carrier aggregation group and a mapping relationship between subframe configurations for carrier aggregation groups and timings; and determines a second downlink subframe from subframes on the carrier aggregation group based on the second timing; and the sending module 703 sends a feedback message to the terminal in the second downlink subframe.

Optionally, the determining module 702 is specifically configured to obtain the subframe configuration for the carrier aggregation group, where the subframe configuration for the carrier aggregation group includes a subframe configuration for the first carrier and/or a subframe configuration for the second carrier; and determine the second timing, based on the subframe configuration information for the carrier aggregation group and the mapping relationship between subframe configurations for carrier aggregation groups and timings.

The apparatus may be configured to execute the method in the foregoing method embodiments. Specific implementations and technical effects thereof are similar to those of the method, and details are not described herein again.

Figure 8:
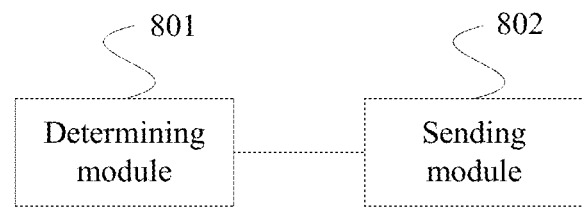
FIG. 8 is a schematic structural diagram of another message feedback apparatus for carrier aggregation according to an embodiment of the present disclosure.

FIG. 8 is a schematic structural diagram of another message feedback apparatus for carrier aggregation according to an embodiment of the present disclosure. The apparatus may be integrated into a base station. As shown in FIG. 8, the apparatus includes a determining module 801 and a sending module 802, where the determining module 801 is configured to determine a third timing, based on a subframe configuration for a carrier aggregation group and a mapping relationship between subframe configurations for carrier aggregation groups and timings, where the carrier aggregation group includes a first carrier and a second carrier; and determine a third downlink subframe corresponding to a to-be-scheduled uplink subframe from subframes on the carrier aggregation group based on the third timing; and the sending module 802 is configured to send uplink scheduling information in the third downlink subframe, where the uplink scheduling information is used to schedule the to-be-scheduled uplink subframe.

Optionally, the determining module 801 is specifically configured to obtain the subframe configuration for the carrier aggregation group, where the subframe configuration for the carrier aggregation group includes a subframe configuration for the first carrier and/or a subframe configuration for the second carrier; and determine the third timing, based on the subframe configuration information for the carrier aggregation group and the mapping relationship between subframe configurations and timings.

The apparatus may be configured to execute the method in the foregoing method embodiments. Specific implementations and technical effects thereof are similar to those of the method, and details are not described herein again.

It should be noted that the foregoing division of the apparatus into the modules is merely logical function division. In actual implementation, some or all of the modules may be integrated into a physical entity or physically separated. These modules may all be implemented in a form of software invoked by a processing element; or may all be implemented in a form of hardware; or some modules may be implemented in a form of software invoked by a processing element, and some modules are implemented in a form of hardware. For example, the determining module may be a separate processing element or integrated into a chip of the apparatus for implementation. Alternatively, the determining module may be stored in a memory of the apparatus in a form of program code, and a processing element of the apparatus invokes and executes the foregoing functions of the determining module. Implementation of other modules is similar to this. In addition, some or all of these modules may be integrated together or implemented separately.

For example, these modules may be configured as one or more integrated circuits implementing the method, for example, one or more application-specific integrated circuits (ASIC), one or more microprocessors (e.g., a digital signal processor (DSP)), or one or more field programmable gate arrays (FPGA). For another example, when a module is implemented in a form of software invoked by a processing element, the processing element may be a general purpose processor, for example, a central processing unit (CPU) or other processors that can invoke the program code. For another example, these modules may be integrated together and implemented in a System-On-a-Chip (SOC) form.

Figure 9:
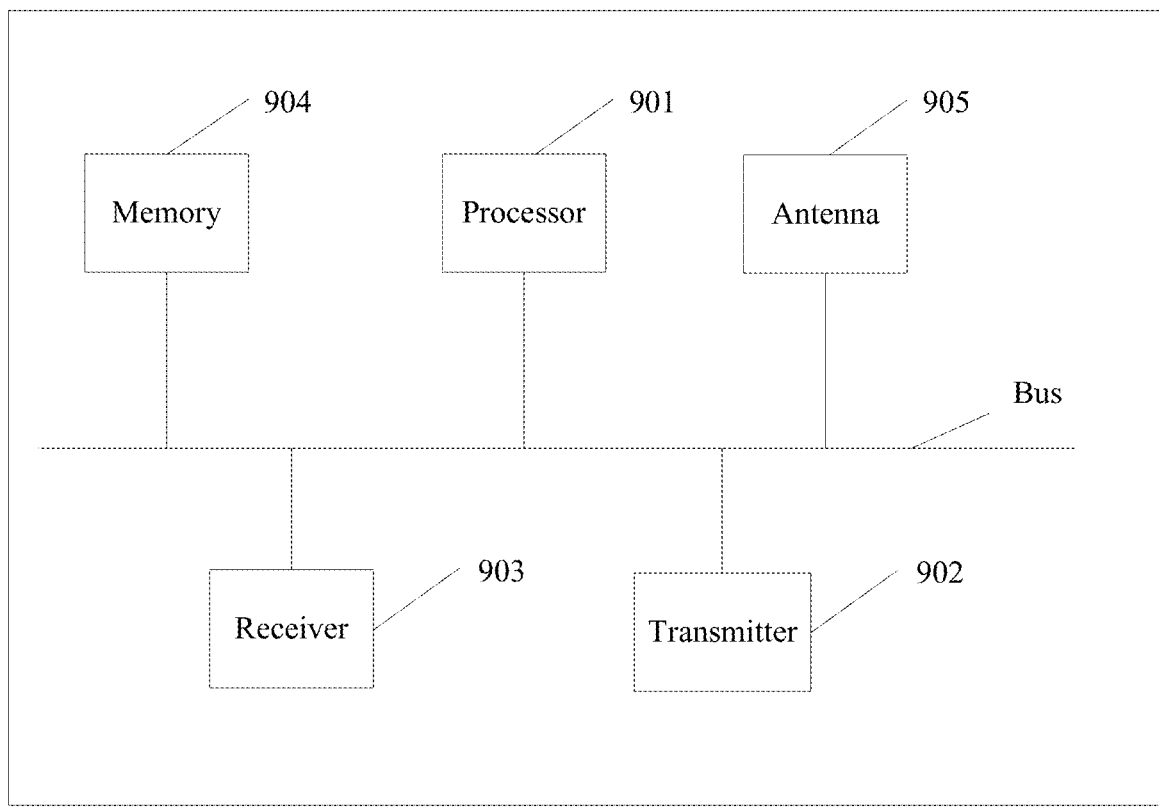
FIG. 9 is a schematic structural diagram of another message feedback apparatus for carrier aggregation according to an embodiment of the present disclosure.

FIG. 9 is a schematic structural diagram of another message feedback apparatus for carrier aggregation according to an embodiment of the present disclosure. The apparatus may be integrated into a terminal. As shown in FIG. 9, the apparatus includes a processor 901, a transmitter 902, a receiver 903, a memory 904, and an antenna 905.

The memory 904, the transmitter 902, and the receiver 903 and the processor 901 may be connected by a bus. Certainly, in actual application, the memory 904, the transmitter 902, and the receiver 903 and the processor 901 may be not of a bus structure, but of another structure, for example, a star structure. This is not specifically limited in this application.

Optionally, the processor 901 may be specifically a general purpose central processing unit or an ASIC, one or more integrated circuits configured to control program execution, a hardware circuit developed by using an FPGA, or a baseband processor.

Optionally, the processor 901 may include at least one processing core.

Optionally, the memory 904 may include one or more of a ROM, a RAM, and a magnetic disk memory. The memory 904 is configured to store data and/or an instruction required by the processor 901 when the processor 901 is running. There may be one or more memories 904.

The apparatus may be configured to execute the method executed by the terminal in the foregoing method embodiments. Specifically, the apparatus is configured to:

receive, in a first downlink subframe on a carrier aggregation group, a data packet sent by a base station, where the carrier aggregation group includes a first carrier and a second carrier;

determine a first timing, based on a subframe configuration for the carrier aggregation group and a mapping relationship between subframe configurations for carrier aggregation groups and timings;

determine a first uplink subframe from subframes on the carrier aggregation group based on the first timing; and send a feedback message to the base station in the first uplink subframe.

Optionally, the processor 901 is specifically configured to obtain the subframe configuration information for the carrier aggregation group, where the subframe configuration for the carrier aggregation group includes a subframe configuration for the first carrier and/or a subframe configuration for the second carrier; and determine the first timing, based on the subframe configuration information for the carrier aggregation group and the mapping relationship between subframe configurations for carrier aggregation groups and timings.

It should be noted that the apparatus executes the method in the foregoing method embodiments. Specific implementations and technical effects thereof are similar to those of the method, and details are not described herein again.

In another embodiment, the apparatus may be configured to execute the method executed by the base station in the foregoing method embodiments. Referring to FIG. 9, a structure of the base station is the same as a structure shown in FIG. 9. The processor 901 executes the following method:

receiving, in a second uplink subframe on a carrier aggregation group, a data packet sent by a terminal, where the carrier aggregation group includes a first carrier and a second carrier;

determining a second timing, based on a subframe configuration for the carrier aggregation group and a mapping relationship between subframe configurations for carrier aggregation groups and timings;

determining a second downlink subframe from subframes on the carrier aggregation group based on the second timing; and sending a feedback message to the terminal in the second downlink subframe.

Optionally, the processor 901 is specifically configured to obtain the subframe configuration for the carrier aggregation group, where the subframe configuration for the carrier aggregation group includes a subframe configuration for the first carrier and/or a subframe configuration for the second carrier; and determine the second timing, based on the subframe configuration information for the carrier aggregation group and the mapping relationship between subframe configurations for carrier aggregation groups and timings.

It should be noted that the apparatus executes the method in the foregoing method embodiments. Specific implementations and technical effects thereof are similar to those of the method, and details are not described herein again.

In another embodiment, the apparatus may be configured to execute the method executed by the base station in the foregoing method embodiments. Referring to FIG. 9, a structure of the base station is the same as a structure shown in FIG. 9. The processor 901 executes the following method:

determining a third timing, based on a subframe configuration for a carrier aggregation group and a mapping relationship between subframe configurations for carrier aggregation groups and timings, where the carrier aggregation group includes a first carrier and a second carrier;

determining a third downlink subframe corresponding to a to-be-scheduled uplink subframe from subframes on the carrier aggregation group based on the third timing; and sending uplink scheduling information in the third downlink subframe, where the uplink scheduling information is used to schedule the to-be-scheduled uplink subframe.

Optionally, the processor 901 is specifically configured to obtain the subframe configuration for the carrier aggregation group, where the subframe configuration for the carrier aggregation group includes a subframe configuration for the first carrier and/or a subframe configuration for the second carrier; and determine the third timing, based on the subframe configuration information for the carrier aggregation group and the mapping relationship between subframe configurations and timings.

It should be noted that the apparatus executes the method in the foregoing method embodiments. Specific implementations and technical effects thereof are similar to those of the method, and details are not described herein again.

A person of ordinary skill in the art may understand that all or some of the steps of the method embodiments may be implemented by a program instructing relevant hardware. The program may be stored in a computer readable storage medium. When the program is executed, the steps of the method embodiments are performed. The foregoing storage medium includes any medium that can store program code, such as a ROM, a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method, comprising:
   receiving, by a terminal in a first downlink subframe of a first carrier aggregation group, a data packet sent by a base station, wherein the first carrier aggregation group comprises a first carrier and a second carrier;
   determining, by the terminal, a first timing based on a first subframe configuration for the first carrier aggregation group and a mapping relationship between a plurality of subframe configurations for a plurality of carrier aggregation groups and a plurality of timings, wherein the determining a first timing comprises selecting a first timing that is larger than a subframe configuration for a primary cell of the carrier aggregation group in response to the first downlink subframe being received through the primary cell;
   determining, by the terminal, a first uplink subframe from a plurality of subframes of the first carrier aggregation group based on the first timing; and
   sending, by the terminal to the base station, a feedback message in the first uplink subframe.

2. The method according to claim 1, wherein determining, by the terminal, the first timing based on the first subframe configuration for the first carrier aggregation group and the mapping relationship between the plurality of subframe configurations for the plurality of carrier aggregation groups and the plurality of timings comprises:
obtaining, by the terminal, the first subframe configuration for the first carrier aggregation group, wherein the first subframe configuration for the first carrier aggregation group comprises a second subframe configuration for the first carrier or a third subframe configuration for the second carrier; and
determining, by the terminal, the first timing based on the first subframe configuration for the first carrier aggregation group and the mapping relationship between the plurality of subframe configurations for the plurality of carrier aggregation groups and the plurality of timings.

3. The method according to claim 2, wherein the first timing indicates that the first uplink subframe is a subframe n and the first downlink subframe is a subframe that is at an interval of k subframes before the subframe n, wherein n is a positive integer greater than or equal to 0, and k is a positive integer greater than 0.

4. The method according to claim 3, wherein:
the first uplink subframe is a subframe n on the first carrier, and the first downlink subframe is a subframe that is at an interval of k subframes before the subframe n on the first carrier; or
the first uplink subframe is a subframe n on the first carrier, and the first downlink subframe is a subframe that is at an interval of k subframes before the subframe n on the second carrier; or
the first uplink subframe is a subframe n on the second carrier, and the first downlink subframe is a subframe that is at an interval of k subframes before the subframe n on the first carrier; or
the first uplink subframe is a subframe n on the second carrier, and the first downlink subframe is a subframe that is at an interval of k subframes before the subframe n on the second carrier.

5. The method according to claim 3, wherein:
the second subframe configuration for the first carrier is a time division duplex (TDD) configuration 2, and the third subframe configuration for the second carrier is a TDD configuration 2 with a 2-subframe shift;
when the first uplink subframe is a subframe n=2 on the first carrier, values of the subframe interval k of the first downlink subframe are 4 and 6 on the first carrier, and values of the subframe interval k of the first downlink subframe are 4, 5, and 6 on the second carrier;
when the first uplink subframe is a subframe n=7 on the first carrier, a value of the subframe interval k of the first downlink subframe is 4 on the first carrier, and values of the subframe interval k of the first downlink subframe are 4 and 5 on the second carrier;
when the first uplink subframe is a subframe n=2 on the second carrier, values of the subframe interval k of the first downlink subframe are 5 and 6 on the first carrier, and a value of the subframe interval k of the first downlink subframe is 6 on the second carrier; and
when the first uplink subframe is a subframe n=7 on the second carrier, values of the subframe interval k of the first downlink subframe are 4, 5 and 6 on the first carrier, and values of the subframe interval k of the first downlink subframe are 4 and 6 on the second carrier.

6. The method according to claim 3, wherein:
the second subframe configuration for the first carrier is a time division duplex (TDD) configuration 1, and the third subframe configuration for the second carrier is the TDD configuration 2 with a 2-subframe shift;
when the first uplink subframe is a subframe n=2 on the first carrier, values of the subframe interval k of the first downlink subframe are 4 and 5 on the second carrier;
when the first uplink subframe is a subframe n=3 on the first carrier, a value of the subframe interval k of the first downlink subframe is 4 on the first carrier, and a value of the subframe interval k of the first downlink subframe is 4 on the second carrier;
when the first uplink subframe is a subframe n=7 on the first carrier, values of the subframe interval k of the first downlink subframe are 4 and 5 on the second carrier;
when the first uplink subframe is a subframe n=8 on the first carrier, a value of the subframe interval k of the first downlink subframe is 4 on the first carrier, and a value of the subframe interval k of the first downlink subframe is 4 on the second carrier;
when the first uplink subframe is a subframe n=2 on the second carrier, values of the subframe interval k of the first downlink subframe are 4 and 5 on the first carrier, and a value of the subframe interval k of the first downlink subframe is 4 on the second carrier; and
when the first uplink subframe is a subframe n=7 on the second carrier, values of the subframe interval k of the first downlink subframe are 4 and 5 on the first carrier, and a value of the subframe interval k of the first downlink subframe is 4 on the second carrier.

7. An apparatus, comprising:
a processor; and
a non-transitory memory configured to store program instructions which, when executed by the processor, cause the apparatus to:
receive, in a first downlink subframe of a first carrier aggregation group, a data packet sent by a base station, wherein the first carrier aggregation group comprises a first carrier and a second carrier;
determine a first timing based on a first subframe configuration for the first carrier aggregation group and a mapping relationship between a plurality of subframe configurations for a plurality of carrier aggregation groups and a plurality of timings, wherein the instructions to determine a first timing comprise instructions to select a first timing that is larger than a subframe configuration for a primary cell of the carrier aggregation group in response to the first downlink subframe being received through the primary cell;
determine a first uplink subframe from a plurality of subframes of the first carrier aggregation group based on the first timing; and
send a feedback message to the base station in the first uplink subframe.

8. The apparatus according to claim 7, wherein the program instructions, when executed by the processor, cause the apparatus to:
obtain the first subframe configuration for the first carrier aggregation group, wherein the first subframe configuration for the first carrier aggregation group comprises a second subframe configuration for the first carrier or a third subframe configuration for the second carrier; and
determine the first timing based on the first subframe configuration for the first carrier aggregation group and the mapping relationship between the plurality of subframe configurations for the plurality of carrier aggregation groups and the plurality of timings.

9. The apparatus according to claim 8, wherein the first timing indicates that the first uplink subframe is a subframe n, and the first downlink subframe is a subframe that is at an interval of k subframes before the subframe n, wherein n is a positive integer greater than or equal to 0, and k is a positive integer greater than 0.

10. The apparatus according to claim 9, wherein:
the first uplink subframe is a subframe n on the first carrier, and the first downlink subframe is a subframe that is at an interval of k subframes before the subframe n on the first carrier.

11. The apparatus according to claim 9, wherein:
the first uplink subframe is a subframe n on the first carrier, and the first downlink subframe is a subframe that is at an interval of k subframes before the subframe n on the second carrier.

12. The apparatus according to claim 9, wherein:
the first uplink subframe is a subframe n on the second carrier, and the first downlink subframe is a subframe that is at an interval of k subframes before the subframe n on the first carrier.

13. The apparatus according to claim 9, wherein:
the first uplink subframe is a subframe n on the second carrier, and the first downlink subframe is a subframe that is at an interval of k subframes before the subframe n on the second carrier.

14. A non-transitory computer-readable storage medium storing a program to be executed by a processor, the program including instructions for:
receiving, by a terminal in a first downlink subframe of a first carrier aggregation group, a data packet sent by a base station, wherein the first carrier aggregation group comprises a first carrier and a second carrier;
determining, by the terminal, a first timing based on a first subframe configuration for the first carrier aggregation group and a mapping relationship between a plurality of subframe configurations for a plurality of carrier aggregation groups and a plurality of timings, wherein the determining a first timing comprises selecting a first timing that is larger than a subframe configuration for a primary cell of the carrier aggregation group in response to the first downlink subframe being received through the primary cell;
determining, by the terminal, a first uplink subframe from a plurality of subframes of the first carrier aggregation group based on the first timing; and
sending, by the terminal to the base station, a feedback message in the first uplink subframe.

15. The non-transitory computer-readable storage medium according to claim 14, wherein determining, by the terminal, the first timing based on the first subframe configuration for the first carrier aggregation group and the mapping relationship between the plurality of subframe configurations for the plurality of carrier aggregation groups and the plurality of timings comprises:
obtaining, by the terminal, the first subframe configuration for the first carrier aggregation group, wherein the first subframe configuration for the first carrier aggregation group comprises a second subframe configuration for the first carrier or a third subframe configuration for the second carrier; and
determining, by the terminal, the first timing based on the first subframe configuration for the first carrier aggregation group and the mapping relationship between the plurality of subframe configurations for the plurality of carrier aggregation groups and the plurality of timings.

16. The non-transitory computer-readable storage medium according to claim 15, wherein the first timing indicates that the first uplink subframe is a subframe n and the first downlink subframe is a subframe that is at an interval of k subframes before the subframe n, wherein n is a positive integer greater than or equal to 0, and k is a positive integer greater than 0.

17. The non-transitory computer-readable storage medium according to claim 16, wherein:
the first uplink subframe is a subframe n on the first carrier, and the first downlink subframe is a subframe that is at an interval of k subframes before the subframe n on the first carrier; or
the first uplink subframe is a subframe n on the first carrier, and the first downlink subframe is a subframe that is at an interval of k subframes before the subframe n on the second carrier; or
the first uplink subframe is a subframe n on the second carrier, and the first downlink subframe is a subframe that is at an interval of k subframes before the subframe n on the first carrier; or
the first uplink subframe is a subframe n on the second carrier, and the first downlink subframe is a subframe that is at an interval of k subframes before the subframe n on the second carrier.

18. The non-transitory computer-readable storage medium according to claim 16, wherein:
the second subframe configuration for the first carrier is a time division duplex (TDD) configuration 2, and the third subframe configuration for the second carrier is a TDD configuration 2 with a 2-subframe shift;
when the first uplink subframe is a subframe n=2 on the first carrier, values of the subframe interval k of the first downlink subframe are 4 and 6 on the first carrier, and values of the subframe interval k of the first downlink subframe are 4, 5, and 6 on the second carrier;
when the first uplink subframe is a subframe n=7 on the first carrier, a value of the subframe interval k of the first downlink subframe is 4 on the first carrier, and values of the subframe interval k of the first downlink subframe are 4 and 5 on the second carrier;
when the first uplink subframe is a subframe n=2 on the second carrier, values of the subframe interval k of the first downlink subframe are 5 and 6 on the first carrier, and a value of the subframe interval k of the first downlink subframe is 6 on the second carrier; and
when the first uplink subframe is a subframe n=7 on the second carrier, values of the subframe interval k of the first downlink subframe are 4, 5 and 6 on the first carrier, and values of the subframe interval k of the first downlink subframe are 4 and 6 on the second carrier.

19. The non-transitory computer-readable storage medium according to claim 16, wherein:
the second subframe configuration for the first carrier is a time division duplex (TDD) configuration 1, and the third subframe configuration for the second carrier is the TDD configuration 2 with a 2-subframe shift;
when the first uplink subframe is a subframe n=2 on the first carrier, values of the subframe interval k of the first downlink subframe are 4 and 5 on the second carrier;
when the first uplink subframe is a subframe n=3 on the first carrier, a value of the subframe interval k of the first downlink subframe is 4 on the first carrier, and a value of the subframe interval k of the first downlink subframe is 4 on the second carrier;
when the first uplink subframe is a subframe n=7 on the first carrier, values of the subframe interval k of the first downlink subframe are 4 and 5 on the second carrier;
when the first uplink subframe is a subframe n=8 on the first carrier, a value of the subframe interval k of the first downlink subframe is 4 on the first carrier, and a value of the subframe interval k of the first downlink subframe is 4 on the second carrier;

when the first uplink subframe is a subframe n=2 on the second carrier, values of the subframe interval k of the first downlink subframe are 4 and 5 on the first carrier, and a value of the subframe interval k of the first downlink subframe is 4 on the second carrier; and when the first uplink subframe is a subframe n=7 on the second carrier, values of the subframe interval k of the first downlink subframe are 4 and 5 on the first carrier, and a value of the subframe interval k of the first downlink subframe is 4 on the second carrier.

* * * * *